United States Patent
Gam

[11] Patent Number: 5,908,910
[45] Date of Patent: Jun. 1, 1999

[54] CATHODIC ELECTROCOATING COMPOSITIONS CONTAINING AN ANTICRATER AGENT

[75] Inventor: Allisa Gam, Troy, Mich.

[73] Assignee: E. I. du Pont de Nemours and Company, Wilmington, Del.

[21] Appl. No.: 08/995,772

[22] Filed: Dec. 22, 1997

Related U.S. Application Data

[62] Division of application No. 08/772,613, Dec. 23, 1996, Pat. No. 5,750,596.

[51] Int. Cl.$^6$ .................................................. C08G 65/32
[52] U.S. Cl. ............................ 528/28; 204/489; 204/499; 204/506; 556/421
[58] Field of Search .................... 204/489, 499, 204/502, 504, 505, 506; 556/44, 423, 424, 463, 465, 482; 528/28

[56] References Cited

U.S. PATENT DOCUMENTS

| | | |
|---|---|---|
| 3,252,825 | 5/1966 | Marzocchi et al. ..................... 117/126 |
| 3,947,339 | 3/1976 | Jerabek et al. .......................... 204/181 |
| 4,017,438 | 4/1977 | Jerabek et al. .................. 260/29.2 EP |
| 4,423,166 | 12/1983 | Moriarity et al. ...................... 523/414 |
| 4,432,850 | 2/1984 | Moriarity ................................ 204/181 |
| 4,988,778 | 1/1991 | Chang et al. ........................... 525/476 |
| 5,017,632 | 5/1991 | Bredow et al. ......................... 523/400 |
| 5,039,385 | 8/1991 | Tominaga ............................ 204/181.7 |
| 5,069,767 | 12/1991 | Tominaga ............................ 204/181.7 |
| 5,096,556 | 3/1992 | Corrigan et al. ..................... 204/181.7 |
| 5,162,060 | 11/1992 | Bredow et al. ......................... 106/808 |
| 5,356,960 | 10/1994 | Chung et al. ........................... 523/404 |
| 5,371,261 | 12/1994 | Wang et al. ............................ 556/421 |
| 5,582,705 | 12/1996 | Valko et al. ............................ 523/415 |

*Primary Examiner*—Robert Dawson
*Assistant Examiner*—D. Aylward
*Attorney, Agent, or Firm*—Hilmar L. Fricke

[57] ABSTRACT

An improved aqueous electrocoating composition that contains an anticrater agent which is a reaction product of polyoxyalkylene diamine and isocyanto alkyl alkoxy silane which is hydrolyzed and has a number average molecular weight of about 2,000–5,000; electrodeposited finishes are formed that have a significant reduction in craters and are smooth and even finishes.

1 Claim, No Drawings

CATHODIC ELECTROCOATING COMPOSITIONS CONTAINING AN ANTICRATER AGENT

This is a division of application Ser. No. 08/772,613 filed Dec. 23, 1996, U.S. Pat. No. 5,750,596.

BACKGROUND OF THE INVENTION

This invention is directed to a cathodic electrocoating composition and in particular to a cathodic electrocoating composition containing an anticrater agent which significantly reduces craters and improves the smoothness of an electrodeposited film of the composition.

The coating of electrically conductive substrates by an electrodeposition process, also called an electrocoating process is a well known and important industrial process. Electrodeposition of primers to automotive substrates is widely used in the automotive industry. In this process, a conductive article, such as an autobody or an auto part, is immersed in a bath of a coating composition of an aqueous emulsion of film forming polymer and acts as an electrode in the electrodeposition process. An electric current is passed between the article and a counter-electrode in electrical contact with the aqueous emulsion, until a desired coating is deposited on the article. In a cathodic electrocoating process, the article to be coated is the cathode and the counter-electrode is the anode.

Resin compositions used in the bath of a typical cathodic electrodeposition process also are well known in the art. These resins typically are made from polyepoxide resins which have been chain extended and then an adduct is formed to include amine groups in the resin. Amine groups typically are introduced through reaction of the resin with an amine compound. These resins are blended with a crosslinking agent and then neutralized with an acid to form a water emulsion which is usually referred to as a principal emulsion.

The principal emulsion is combined with a pigment paste, coalescent solvents, water, and other additives to form the electrocoating bath. The electrocoating bath is placed in an insulated tank containing the anode. The article to be coated is the cathode and is passed through the tank containing the electrodeposition bath. The thickness of the coating that is deposited on the article being electrocoated is a function of the bath characteristics, the electrical operating characteristics of the tank, the immersion time, and the like.

The resulting coated article is removed from the bath after a set period of time and is rinsed with deionized water. The coating on the article is cured typically in an oven at sufficient temperature to produce a crosslinked finish on the article.

Cathodic electrocoating compositions, resin compositions, coating baths and cathodic electrodeposition processes are disclosed in Jarabek et al U.S. Pat. No. 3,922,253 issued Nov. 25, 1975; Wismer et al U.S. Pat. No. 4,419,467 issued Dec. 6, 1983; Belanger U.S. Pat. No. 4,137,140 issued Jan. 30, 1979 and Wismer et al U.S. Pat. No. 4,468,307 issued Aug. 25, 1984.

A continuing problem with cathodic electrocoating compositions has been the presence of craters in the cured finish. An additive or agent is needed for electrocoating compositions so that crater-free, smooth and even finishes are formed on electrodeposition and curing. Chung et al U.S. Pat. No. 5,356,960 issued Oct. 18, 1994 shows an anticrater addititve that forms a crater free, smooth and even finish. However, when this additive is used in an electrocoating composition that is baked in an indirect gas oven after application to a metal substrate such as an automobile or truck body, this anticrater additive migrates very readily to the surface of the electrocoating composition during baking and any primer compositions applied over such a surface containing polymeric melamine crosslinking agents adhere poorly to the electrocoat composition and hence, adhesion failure of any topcoat applied over the primer is readily evident. An anticrater additive is needed that will not migrate to the surface of the deposited electrocoating composition during baking and should not adversely affect other properties such as the throwing power of the electrocoating bath, the curing of the deposited coating or the film properties of the resulting finish.

SUMMARY OF THE INVENTION

An improved aqueous cathodic electrocoating composition having a binder of an epoxy-amine adduct and a blocked polyisocyanate crosslinking agent; wherein the improvement is the use of an anticrater agent which is a silane terminated reaction product of polyoxyalkylene diamine and an isocyanato alkyl alkoxy silane which is hydrolyzed and the anticrater agent has a number average molecular weight ratio of about 2,000–5,000 determined by Gel Permeation Chromatography (GPC) using polystyrene as the standard.

DETAILED DESCRIPTION OF THE INVENTION

The novel anticrater agent is readily incorporated into the electrocoating composition by dispersing it with a nonionic surfactant in water and then adding it to an aqueous electrocoating composition since it is compatible with the other constituents of the composition. The anticrater agent remains stable in the composition and in the electrocoating bath for extended periods of time under conventional bath operating conditions since it is not reactive with the other constituents in the composition. The anticrater agent significantly reduces and often eliminates craters in electrodeposited coatings and forms smooth and even finishes does not migrate to the surface on baking of the finish. Also, the additive does not adversely affect other properties of the electrocoating bath or finishes of the electrocoating composition. Further, the anticratering agent can be used as a rheology control agent to improve edge protection of an electrodeposited finish.

The anticrater additive is used in an electrocoating composition in a sufficient amount to significantly reduce or eliminate cratering in the electrodeposited finish. Generally, the anticrater agent is used in the electrocoating composition at a level of at least 0.5% by weight, based on the total weight of binder solids in the electrocoating composition and preferably, it is used at a level of about 0.5–10% by weight. More preferably, about 1–5% by weight of the anticrater agent is used. The binder of the electrocoating composition typically is a blend of an epoxy amine adduct and a blocked polyisocyanate crosslinking agent.

The anticrater agent is prepared by reacting a polyoxyalkylene diamine with isocyanato alkyl alkoxy silane in a 1:2 molar ratio to form an anticratering agent having terminal silane groups. These constituents are reacted at a temperature of about 70 to 130° C. for about 1 to 5 hours until there is no residual isocyanate present and subsequently hydrolyzed. The anticrater agent has a number average molecular weight of about 2,000–5,000.

The polyoxyalkylene diamine used to form the anticrater agent has 2–4 carbon atoms in the alkylene group and preferably is polyoxypropylene diamine having number average molecular weight of about 230–3,000 preferably, 1,500–2,500 such as Jeffamine D-2000® having a number average molecular weight of about 2000 available from Texaco Chemical Company. Another polyoxyalkylene diamine that can be used is polyoxyethylene diamine having a similar molecular weight.

Typically useful isocyanato alkyl alkoxy silanes have the formula O=C=N(CH$_2$)$_n$Si(OR)$_3$ where R is methyl, ethyl, or a mixture of methyl and ethyl and n is 1–3. Typical silanes are isocyanto propyl trimethoxy silane, isocyanato ethyl trimethoxy silane, isocyanato methyl trimethoxy silane, isocyanto methyl triethoxy silane, isocyanato ethyl triethoxy silane, isocyanto propyl triethoxy silane. Isocyanoto propyl trimethoxy silane is preferred to form a high quality anticrater agent.

The anticrater agent can be added to the electrocoating composition at almost any time. It can be added to the principal emulsion, or to the bath the anticrater agent is blended with a nonionic surfactant and an acid such as lactic acid and dispersed in water until hydrolysis of silane group to silanol groups is completed and then added to the electrocoating composition as indicated above.

The anticrater agent after complete hydrolysis has the following structural formula:

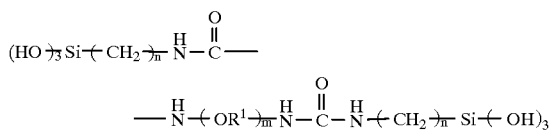

where n is 1–3 and m is 5–40 and R$^1$ is an alkyl group having 2–4 carbon atoms.

Most principal emulsions used in an electrocoating composition comprise an aqueous emulsion of a binder of an epoxy amine adduct blended with a crosslinking agent which has been neutralized with an acid to form a water soluble product.

The anticrater agent is potentially usable with a variety of different cathodic electrocoat resins, but the preferred resin is the typical epoxy-amine adduct of the prior art. These resins are generally disclosed in U.S. Pat. No. 4,419,467 which is incorporated by reference.

Typical acids used to neutralize the epoxy-amine adduct to form water dispersible cationic groups are lactic acid, acetic acid, formic acid, sulfamic acid, alkane sulfonic acids such as methane sulfonic acid and the like.

Preferred crosslinkers for the above resins are also well known in the prior art. These are aliphatic, cycloaliphatic and aromatic isocyanates such as hexamethylene diisocyanate, cyclohexamethylene diisocyanate, toluene diisocyanate, methylene diphenyl diisocyanate and the like. These isocyanates are pre-reacted with a blocking agent such as oximes, alcohols, or caprolactams which block the isocyanate functionality, i.e., the crosslinking functionality. Upon heating the blocking agents separate, thereby providing a reactive isocyanate group and crosslinking occurs. Isocyanate crosslinkers and blocking agents are well known in the prior art and also are disclosed in the aforementioned U.S. Pat. No. 4,419,467.

The cathodic binder of the epoxy amine adduct and the blocked isocyanate are the principal resinous ingredients in the electrocoating composition and are usually present in amounts of about 30 to 50% by weight of solids of the composition. To form an electrocoating bath, the solids are generally reduced with an aqueous medium.

Besides the binder resin described above, the electrocoating composition usually contains pigment which is incorporated into the composition in the form of a pigment paste. The pigment paste is prepared by grinding or dispersing a pigment into a grinding vehicle and optional ingredients such as wetting agents, surfactants, and defoamers. Any of the pigment grinding vehicles that are well known in the art can be used or the anticrater agent of this invention can be used. After grinding, the particle size of the pigment should be as small as practical, generally, the particle size is about 6–8 using a Hegman grinding gauge.

Pigments which can be used in this invention include titanium dioxide, basic lead silicate, strontium chromate, carbon black, iron oxide, clay and the like. Pigments with high surface areas and oil absorbencies should be used judiciously because these can have an undesirable affect on coalescence and flow of the electrodeposited coating.

The pigment to binder weight ratio is also important and should be preferably less than 0.5:1, more preferably less than 0.4:1, and usually about 0.2 to 0.4:1. Higher pigment to binder weight ratios have been found to adversely affect coalescence and flow.

The coating compositions of the invention can contain optional ingredients such as wetting agents, surfactants, defoamers and the like. Examples of surfactants and wetting agents include alkyl imidazolines such as those available from Ciba-Geigy Industrial Chemicals as "Amine C", acetylenic alcohols available from Air Products and Chemicals as "Surfynol 104". These optional ingredients, when present, constitute from about 0.1 to 20 percent by weight of binder solids of the composition.

Optionally, plasticizers can be used to promote flow. Examples of useful plasticizers are high boiling water immiscible materials such as ethylene or propylene oxide adducts of nonyl phenols or bisphenol A. Plasticizers are usually used at levels of about 0.1 to 15 percent by weight resin solids.

The electrocoating composition of this invention is an aqueous dispersion. The term "dispersion" as used within the context of this invention is believed to be a two-phase translucent or opaque aqueous resinous binder system in which the binder is in the dispersed phase and water the continuous phase. The average particle size diameter of the binder phase is about 0.1 to 10 microns, preferably, less than 5 microns. The concentrations of the binder in the aqueous medium in general is not critical, but ordinarily the major portion of the aqueous dispersion is water. The aqueous dispersion usually contains from about 3 to 50 percent preferably 5 to 40 percent by weight binder solids. Aqueous binder concentrates which are to be further diluted with water when added to an electrocoating bath, generally have a range of binder solids of 10 to 30 percent weight.

The following example illustrates the invention. All parts and percentages are on a weight basis unless otherwise indicated.

EXAMPLE

Preparation of Anticrater Agent

The anticrater agent was prepared by charging 999.7 parts of Jeffamine D2000® (polyoxypropylene diamine having a number molecular weight of 2000) and 0.04 parts of dibutyl tin dilaurate into a suitable reaction vessel and heated to 37° C. under a dry nitrogen blanket. 205 parts of isocyanato propyltrimethoxy silane was slowly charged into the reaction vessel while maintaining the reaction mixture below 82° C. for an additional hour until essentially all of the isocyante was reduced as indicated by infrared scan of the mixture. The adduct was then dispersed by mixing in an aqueous medium of 5288.33 deionized water, 58.73 parts of lactic acid and 1174.62 parts of ethoxylated styrenated phenol (Synfac 8334®) and agitated for at least two hours for complete hydrolysis of silane groups to silanol groups. The resulting adduct solution had a nonvolatile content of 30%.

Preparation of Chain Extended Polyepoxide Solution

The following ingredients were charged into a suitable reaction vessel: 1478 parts of Epon 828® (Epoxy resin of diglycidyl ether of bisphenol A having an epoxy equivalent weight of 188); 427 parts bisphenol A; 533 parts ethoxylated bisphenol A having a hydroxy equivalent weight of 247 (Synfac 8009®) and 121 parts xylene. The resulting reaction mixture was heated to 160° C. under nitrogen blanket and held at room temperature for 1 hour. 5.1 parts dimethyl benzyl amine were added and the mixture was held at 147° C. until an epoxy equivalent weight of 1050 was obtained. The reaction mixture was cooled to 98° C. and 168 parts of diketimine (reaction product of diethylenetriamine and methyl isobuty ketone having a nonvolatile content of 72.27%) and 143 parts of methyl ethanol amine were added. The resulting mixture was held at 120° C. for 1 hour and then 727 parts of methyl isobutyl ketone were added. The resulting resin solution had a nonvolatile content of 75%.

Preparation of Crosslinking Resin Solution

An alcohol blocked polyisocyanate crosslinking resin solution was prepared by charging 317.14 parts of PAPI 2027® (methylene diphenyl diisocyanate), 47.98 parts of methyl isobutyl ketone and 0.064 parts of dibutyl tin dilaurate into a suitable reaction vessel and heated to 37° C. under a nitrogen blanket. A mixture of 323.10 parts of diethylene glycol mono butyl ether and 13.04 parts of trimethylolpropane was slowly charged into the reaction vessel while maintaining the reaction mixture below 93° C. for an additional hour until essentially all of the isocyanate was reacted as indicated by infrared scan of the reaction mixture. 2.30 parts of butanol and 167.37 parts of methyl isobutyl ketone were added. The resulting resin solution had a nonvolatile content of 75%.

Preparation of Quaternizing Agent

The quaternizing agent was prepared by adding 87 parts dimethylethanolamine to 320 parts ethylhexanol half-capped toluene diisocyanate in the reaction vessel at room temperature. An exothermic reaction occured and the reaction mixture was stirred for one hour at 80° C. 118 parts aqueous lactic acid solution (75% nonvolatile content) was then added followed by the addition of 39 parts 2-butoxyethanol. The reaction mixture was held for about one hour at 65° C. with constant stirring to form quaternizing agent.

Preparation of Pigment Grinding Vehicle

The pigment grinding vehicle was prepared by charging 710 parts Epon 829® (diglycidyl ether of bisphenol A having an epoxide equivalent weight of 193–203) and 290 parts bisphenol A into a suitable vessel under nitrogen blanket and heated to 150–160° C. to initiate an exothermic reaction. The exothermic reaction was continued for about one hour at 150–160° C. The reaction mixture was then cooled to 120° and 496 part of 2-ethylhexanol half capped toluene diisocyanate was added. The temperature of the reaction mixture was held at 110–120° C. for one hour, followed by the addition of 1095 parts of 2-butoxyethanol, the reaction mixture was then cooled to 85–90° C. and then 71 parts of deionized water was added followed by the addition of 496 parts quarternizing agent (prepared above). The temperature of the reaction mixture was held at 85–90° C. until an acid value of about 1 was obtained.

I. Preparation of Emulsion

|  | Parts by Weight |
|---|---|
| Chain extended polyepoxide solution (prepared above) | 1255.31 |
| Crosslinking resin solution (prepared above) | 805.85 |
| Surfactant[1] | 13.62 |
| Lactic Acid | 27.24 |
| Deionized water | 1897.98 |
| Total | 4000.00 |

[1]Surfactant - 120 parts Amine ® C from Ciba Geigy, 120 parts acetylenic alcohol available as Surfynol ® 104 from AirProducts and Chemicals, Inc., 120 parts 1-butoxyethanol, 221 parts of deionized water and 19 parts glacial acetic acid.

The chain extended polyepoxide solution, crosslinking resin solution surfactant and lactic acid were thoroughly mixed. The deionized water was then added under agitation. The emulsion nonvolatile content was adjusted to 36% with the necessary amount of deionized water. The emulsion was kept agitated until the methyl isobutyl ketone had evaporated.

II. Preparation of Pigment Paste

|  | Parts by Weight |
|---|---|
| Pigment grinding vehicle (prepared above) | 812 |
| Deionized water | 1660 |
| Titanium dioxide pigment | 1068 |
| Aluminum silicate pigment | 212 |
| Lead silicate pigment | 92 |
| Carbon black pigment | 32 |
| Dibutyl tin oxide | 124 |
| Total | 4000 |

The above ingredients were mixed until homogenous mixture was formed in a suitable mixing container. Then were dispersed by charging the mixture into a sand mill and then grinding until Hegman reading of seven or greater was obtained.

III. Preparation of Electrocoating Baths I and II

|  | Parts by Weight | |
|---|---|---|
|  | Bath I | Bath II |
| Emulsion (prepared above) | 1636 | 1569 |
| Deionized water | 1926 | 1913 |
| Pigment Paste (prepared above) | 398 | 398 |
| Anticrater Agent (prepared above) | 40 | 120 |
| Total | 4000 | 4000 |

A Cationic electrocoating Bath I and II were prepared by mixing the above ingredients. Each bath was then ultrafiltered. Each bath was electrocoated at 250–270 volts to obtain 0.9–1.0 mils (22.86–25.4 microns). ASPP blow out crater test is used to test each bath. Crater resistance was rated according to the following rating scale of A–E:

A—0–10% defects
    B—11–20% defects
    C—21–40% defects
    D—41–80% defects
    E—Greater than 80% defects The crater resistant rating for both Baths I and II was A.

An electrocoating bath was prepared identical to Bath I above except the anticrater agent was replaced with a conventional anti cratering agent which is the reaction product of Jeffamine® 2000 and Epon® 1001 epoxy resin and the crater resistance of this bath was tested as above by using the ASPP blow out crater test. The crater resistance rating for this panel was E which is substantially inferior to the panels coated in Baths I and II which contained the anticrater agent of this invention.

In order to measure edge corrosion resistance, knife blades (10×2 cm) were electrocoated in Baths I and II at 250 volts and baked at 182° C. (metal temperature) for 10 minutes. The knife blades then were exposed to salt spray for 7 days. The number of rust spots on each blade were counted by viewing the blades under a microscope. The blades from Bath I had 100–120 rust spots while the blades from Bath II had 40–50 rust spots which shows that Bath II which contained three times the amount of anticratering agent provided better edge corrosion protection.

I claim:

1. An anticrater agent consists of the structural formula:

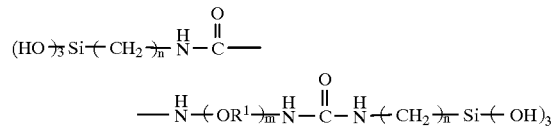

where n is 1–3 and m is 5–40 and $R^1$ is an alkyl group having 2–4 carbon atoms.

* * * * *